US008977265B2

(12) United States Patent
Lee et al.

(10) Patent No.: US 8,977,265 B2
(45) Date of Patent: Mar. 10, 2015

(54) METHOD FOR PERFORMING HANDOFF IN WIRELESS NETWORK

(75) Inventors: In-Sun Lee, Seoul (KR); Kyuno-Hun Jang, Suwon-si (KR); Min-Ho Shin, Laurel, MD (US); William Albert Arbaugh, Ellicott City, MD (US); Arunesh Mishra, Greenbelt, MD (US)

(73) Assignees: Samsung Electronics Co., Ltd., Suwon-si (KR); University of Maryland College Park, College Park, MD (US)

( * ) Notice: Subject to any disclaimer, the term of this patent is extended or adjusted under 35 U.S.C. 154(b) by 1625 days.

(21) Appl. No.: 11/003,130

(22) Filed: Dec. 3, 2004

(65) Prior Publication Data

US 2005/0143073 A1  Jun. 30, 2005

Related U.S. Application Data

(63) Continuation of application No. 10/703,516, filed on Nov. 10, 2003, now Pat. No. 8,838,103.

(60) Provisional application No. 60/425,109, filed on Nov. 8, 2002.

(51) Int. Cl.
*H04W 36/00* (2009.01)
*H04W 84/12* (2009.01)
*H04W 84/18* (2009.01)
(Continued)

(52) U.S. Cl.
CPC ...... *H04W 36/0055* (2013.01); *H04W 36/0016* (2013.01); *H04W 36/0038* (2013.01); *H04W 84/12* (2013.01); *H04W 84/18* (2013.01);
(Continued)

(58) Field of Classification Search
USPC .......................... 370/331; 455/432.1, 436–444
See application file for complete search history.

(56) References Cited

U.S. PATENT DOCUMENTS 6,360,264 B1 * 3/2002 Rom .............................. 709/227
6,370,380 B1 * 4/2002 Norefors et al. .............. 455/436
(Continued)

FOREIGN PATENT DOCUMENTS

CN  1231812 A  10/1999
CN  1308480 A   8/2001
(Continued)

OTHER PUBLICATIONS

Koodli et al., Fast Handovers and Context Transfers in Mobile Networks, Computer Communication Review, Oct. 2001.
(Continued)

*Primary Examiner* — Charles Appiah
*Assistant Examiner* — Jaime Holliday
(74) *Attorney, Agent, or Firm* — NSIP Law (57) ABSTRACT

A method for minimizing handoff latencies when a handoff is performed in a wireless network. An access point (AP) or base station associated to a current wireless station (STA) allows information required for a reassociation to the STA to be propagated to handoff-capable neighboring APs or base stations. When the STA moves, a neighboring AP or base station performs the reassociation to the STA on the basis of context. When a handoff procedure is performed, the time taken to receive context of a corresponding STA is reduced, such that a fast handoff can be implemented.

31 Claims, 4 Drawing Sheets

(51) Int. Cl.
*H04W 40/00* (2009.01)
*H04W 92/20* (2009.01)

(52) U.S. Cl.
CPC ........... *H04W36/0033* (2013.01); *H04W 40/00* (2013.01); *H04W 92/20* (2013.01)
USPC ........ 455/436; 370/331; 455/432.1; 455/437; 455/438; 455/439; 455/440; 455/441; 455/442; 455/443; 455/444

(56) References Cited

U.S. PATENT DOCUMENTS

| | | | |
|---|---|---|---|
| 6,456,850 B1 * | 9/2002 | Kim et al. | 455/453 |
| 6,473,413 B1 * | 10/2002 | Chiou et al. | 370/331 |
| 6,594,493 B1 * | 7/2003 | Davies et al. | 455/436 |
| 7,050,793 B1 * | 5/2006 | Kenward et al. | 455/414.4 |
| 7,107,057 B2 * | 9/2006 | Arazi et al. | 455/443 |
| 7,236,786 B2 * | 6/2007 | Shen et al. | 455/436 |
| 7,388,851 B2 * | 6/2008 | Trossen | 370/331 |
| 2003/0084287 A1 | 5/2003 | Wang et al. | |
| 2004/0203781 A1 * | 10/2004 | Lefkowitz | 455/436 |

FOREIGN PATENT DOCUMENTS

| | | |
|---|---|---|
| EP | 1 124 400 | 8/2001 |
| EP | 1124400 A2 | 8/2001 |
| GB | 2 343 330 | 5/2000 |
| JP | 11-187452 | 7/1999 |
| JP | 2001-203715 | 7/2001 |
| JP | 2001-258059 | 9/2001 |
| JP | 2001-313979 | 11/2001 |
| JP | 2002-118560 | 4/2002 |
| JP | 2002-125270 | 4/2002 |
| JP | 2002-237781 | 8/2002 |
| WO | WO 98/15150 | 4/1998 |
| WO | WO 98/15150 A1 | 4/1998 |
| WO | WO 99/41925 A | 8/1999 |
| WO | WO 01/39538 | 5/2001 |

OTHER PUBLICATIONS

Pack at al., Pre-Authenticated Fast Handoff in a Public Wireless LAN Based on IEEE 802.1x Model, Personal Wireless Communications, Oct. 2002.

Gopal et al., Policy Based Access Router Selections and Context Transfers in Mobile IP Network, Conference on Network Control and Engineering for Quality of Service, Security and Mobility, Oct. 2002.

Sangheon Pack et al., "Pre-Authenticated Fast Handoff in a Public Wireless LAN based on IEEE 802.1X Model," Oct. 2002, School of Computer Science & Engineering, Seoul National University, pp. 1-8.

Ram Gopal L et al., "Policy Based Access Router Selections and Context Transfers in Mobile IP Network," Oct. 2002, pp. 3-14.

Rajeev Kooli et al., "A Context Transfer Framework for Seamless Mobility," Nov. 2001, pp. i-29.

Chinese Examination Report dated Jul. 12, 2011, in counterpart Chinese Patent Application No. 200810149202.7 (6 pages, in Chinese).

* cited by examiner

METHOD FOR PERFORMING HANDOFF IN WIRELESS NETWORK

PRIORITY

This application is a Continuation of U.S. patent application Ser. No. 10/703,516 filed Nov. 10, 2003 now U.S. Pat. No. 8,836,103, which claims priority to a provisional application entitled "A METHOD FOR FAST AND SECURE WIRELESS LOCAL AREA NETWORK HANDOFFS", filed in the United States Patent and Trademark Office on Nov. 8, 2002 and assigned Ser. No. 60/425,109, the contents of which are hereby incorporated by reference.

GOVERNMENT RIGHTS

This invention was made with Government support under Contract No. 60NANB1D0113 awarded by the National Institute of Standards and Technology, and under Contract No. MDA90402C0428 awarded by the National Security Agency. The U.S. Government has certain rights in the invention.

BACKGROUND OF THE INVENTION

1. Field of the Invention

The present invention relates to a method for performing a handoff in a fast and secure wireless network, and more particularly to a method for minimizing handoff latencies.

2. Description of the Related Art

Conventionally, a local area network (LAN) is a collection of personal terminals, main frames and workstations coupled to a communication link within a distance of 300 meters or less. The LAN is a high-speed communication network for allowing employees in a company to be aware of information, i.e., a distance in which an electric current or radio wave signal can be correctly transferred between the personal terminals, to commonly and most effectively use equipment installed in the company's building. As LANs, wired networks for directly transferring an electrical signal through the communication link have been initially used. The trend has been to replace the wired networks with wireless networks for transferring a signal using a radio wave in accordance with the development of wireless protocols. LANs based on these wireless networks are referred to as wireless local area networks (WLANs). WLANs are based on Institute of Electrical and Electronics Engineers (IEEE) 802.11. IEEE 802.11-based WLANs have seen immense growth in the last few years. It is predicted that the IEEE 802.11-based WLANs will be rapidly developed in the future because of an advantageous effect of convenient network connectivity.

IEEE 802.11 allows for two operating modes, i.e., an ad hoc mode and an infrastructure mode, in relation to a media access control (MAC) layer. In the ad hoc mode, two or more wireless stations (STAs) recognize each other and establish a peer-to-peer communication without any existing infrastructure. Meanwhile, in the infrastructure mode, there is a fixed entity called an access point (AP) that bridges all data between the STAs associated with the AP. The AP and the STAs associated with the AP form a basic service set (BSS) communicating on the unlicensed radio frequency (RF) spectrum.

Figure 1:
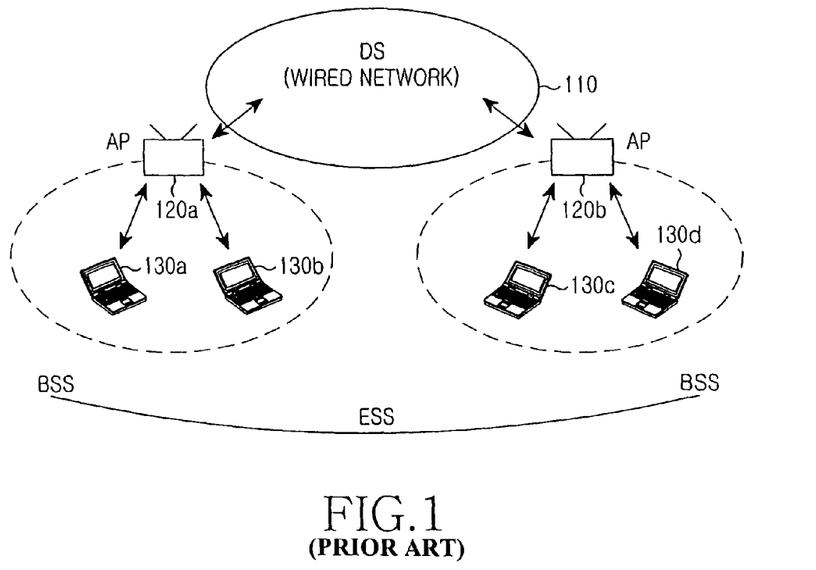
FIG. 1 is a view illustrating the architecture of a conventional wireless local area network (WLAN)

FIG. 1 is a view illustrating the architecture of a conventional wireless local area network (WLAN) for supporting the infrastructure mode.

Referring to FIG. 1, a plurality of access points (APs) 120*a* and 120*b* are connected through one distribution system (DS) 110. The DS 110 is implemented with a wired network. A communication path is formed between the plurality of APs 120*a* and 120*b*. The plurality of APs 120*a* and 120*b* form constant service areas, and serve as bridges between STAs 130*a*, 130*b*, 130*c* and 130*d* and the DS 110. One AP and the STAs associated with the AP form a basic service set (BSS). In other words, a unique BSS is formed on an AP-by-AP basis, and service is provided on a BSS-by-BSS basis. A plurality of BSSs formed by the APs 120*a* and 120*b* can be extended to extended service sets (ESSs). The STAs 130*a*, 130*b*, 130*c* and 130*d* must undergo an authentication procedure to access the WLAN through the APs 120*a* and 120*b* to which the STAs 130*a*, 130*b*, 130*c* and 130*d* belong. In other words, the STAs 130*a*, 130*b*, 130*c* and 130*d* are permitted to access the network through the authentication procedure. There is provided state information required so that the STAs 130*a*, 130*b*, 130*c* and 130*d* can access the network according to the authentication procedure. The state information contains encryption information (based on an encryption code) used to transfer data to the DS 110.

In the WLAN based on the architecture shown in FIG. 1, a wireless station (STA) has mobility and hence can move from one BSS to another BSS. In this case, a handoff is required so that service being received from the one BSS can be continuously provided to the STA by another BSS. An AP to which the STA had physical layer connectivity prior to the handoff is referred to as a "prior-AP", while a new AP to which the STA acquires physical layer connectivity after the handoff is referred to as a "post-AP".

The conventional handoff procedure refers to the mechanism or sequence of messages exchanged between the APs and the STA. In the conventional handoff procedure, physical layer connectivity and state information must be transferred from one AP to another AP with respect to the STA in consideration. The handoff is a physical layer function carried out by at least three participating entities, i.e., an STA, a prior-AP and a post-AP. The state information that is transferred typically consists of the client credentials (which allow the STA to gain network access) and some accounting information. An operation for transferring the state information can be performed by an inter access point protocol (IAPP). For an IEEE 802.11 network that has no access control mechanism, there would be a nominal difference between a completion association and a handoff/reassociation. Looking at it another way, handoff latency would be strictly greater than association latency as there is an additional inter-access point communication delay involved.

Logical steps based on the handoff procedure are classified into a discovery phase and a reauthentication phase.

1. Discovery Phase: Attributing to mobility, the signal strength and the signal-to-noise ratio of a signal from the STA's current AP (or prior-AP) might degrade and cause it to initiate a handoff. At this point, the STA might not be able to communicate with its current AP (or prior-AP). Thus, the STA needs to find potential APs in range to associate to. This is accomplished by a MAC layer function (or scan function). During a scan, the STA listens for beacon messages sent out periodically by APs at a rate of 10 ms, on assigned channels. Thus, the STA can create a priority list, i.e., a list of APs prioritized by the received signal strength. Two kinds of scanning methods defined in the standard are based on an active mode and a passive mode. As the names suggest, in the active mode, apart from listening to beacon messages (which is passive), the STA sends additional probe broadcast packets on each channel and receives responses from APs. Thus, the STA actively searches or probes for potential APs.

2. Reauthentication Phase: The STA sends a reauthentication request to potential APs according to the priority list in the above-described discovery phase. The reauthentication phase typically involves an authentication and a reassociation to the post-AP. The reauthentication phase involves the transfer of credentials and other state information from the prior-AP. As mentioned earlier, this can be achieved through a protocol such as the IAPP. The reauthentication phase includes an authentication phase and a reassociation phase.

Figure 2:
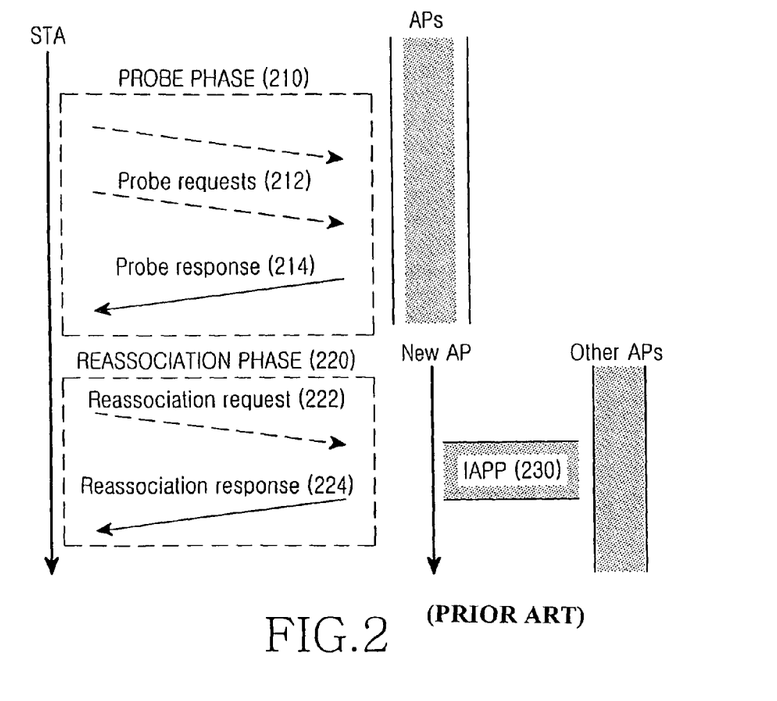
FIG. 2 is a view illustrating a handoff procedure in the conventional WLAN.

FIG. 2 is a view illustrating a handoff procedure in the conventional WLAN. It is assumed in FIG. 2 that the discovery phase is performed in the active mode. The handoff procedure shown in FIG. 2 is divided into a probe phase 210 and a reassociation phase 220.

Referring to FIG. 2, a wireless station (STA) sensing the need for the handoff transmits a probe request message to a plurality of unspecified APs at step 212. The probe request message is defined as information for asking each AP whether or not the handoff can be successfully performed. Upon receiving the probe request message, the APs transmit probe response messages to the STA at step 214. Here, the fact that certain APs have received the probe request message means that the APs are adjacent to the STA. Thus, the APs capable of receiving the probe request message are determined to be potential APs. The STA repeatedly performs the above-described operation on a channel-by-channel basis.

On the other hand, the STA performs the reassociation phase 220 according to priorities of the potential APs registered in a priority list created in the discovery phase. The STA transmits a reassociation request message to a new AP at step 222. In response to the reassociation request message, the new AP performs an inter access point protocol (IAPP) procedure with other APs, i.e., a prior AP of the STA, at step 230. Through the IAPP procedure, the new AP receives credentials and other state information assigned to the STA. Then, the new AP transmits, to the STA, a reassociation response message to the reassociation request message at step 224.

As described above, the conventional handoff procedure starts when the STA transmits a probe request message and ends when the STA receives a reassociation response message. During the handoff procedure, three types of delay are incurred as in the following. The three types of delay include a probe delay incurred in the discovery phase, an authentication delay incurred in the authentication phase and a reassociation delay incurred in the reassociation phase.

1. Probe Delay: Messages transmitted for an active scan at the probe phase 210 shown in FIG. 2 are probe messages. The latency for this process is referred to as a probe delay. The STA transmits a probe request message and waits for responses from APs on each channel. The time during which the STA waits on a particular channel after sending the probe request message corresponds to probe-wait latency. This is determined to be a time difference between subsequent probe request messages. Here, the time is subsequent between PROBE REQUEST MESSAGES on differing channels. According to the above procedure, it has been found that the traffic on the channel and the timing of probe response messages affect the probe-wait time.

2. Authentication Delay: This is the latency (not shown in FIG. 2) incurred during which authentication frames are exchanged. Authentication consists of two or four consecutive frames depending on the authentication method used by the AP. Some wireless network interface cards (NICs) try to initiate a reassociation prior to the authentication, which causes an additional delay in the handoff process.

3. Reassociation Delay: This is the latency incurred during which reassociation frames are exchanged in the reassociation phase 220 shown in FIG. 2. If an authentication process is successful, the STA sends a reassociation request frame to the AP, receives a reassociation response frame, and completes the handoff. Where the IAPP procedure between a new AP and other APs is additionally required, the reassociation delay will further increase.

According to the above, messages during the probe delay form the discovery phase, while the authentication and reassociation delays form the reauthentication phase. Apart from the latencies discussed above, there will potentially be a bridging delay caused by the time taken for the MAC address updates to Ethernet switches which form the distribution system (i.e., the backbone Ethernet). It can be seen that many latencies are incurred while a handoff between an STA and APs is performed in the conventional WLAN. There are problems in that the latencies not only affect the quality of service (QoS) but also disable high-speed roaming.

SUMMARY OF THE INVENTION

Accordingly, it is an aspect of the present invention to provide a method for minimizing handoff latencies.

It is another aspect of the present invention to provide a method for transferring state information of a corresponding wireless station (STA) to access points (APs) before a handoff is performed.

It is yet another aspect of the present invention to provide a handoff method capable of eliminating a tunneling procedure between a prior-access point (AP) and a post-AP and a procedure of transferring state information of a corresponding wireless station (STA) through the tunneling procedure.

It is still another aspect of the present invention to provide a method for generating a neighborhood graph needed to send state information of a wireless station (STA) to potential access points (APs).

It is still yet another aspect of the present invention to provide a method for propagating state information of a wireless station (STA) to neighboring access points (APs) on the basis of a neighborhood graph.

To achieve the above and other aspects of the present invention, there is provided a method of propagating information including context of a station from an access point to another access point in a wireless network. The method includes propagating the information including the context to one or more access points of the wireless network that are fit for handoff of the station thereto from the access point, where the context is present in the access point, in response to association or re-association of the station to the access point.

Additionally, there is provided an access point through which a station accesses a wireless network. The access point includes: a neighborhood graph for containing information on one or more access points of the wireless network that are fit for handoff of the station thereto from the access point; and a storage for storing information including context of the station, wherein the access point propagates information including the context to the one or more access points in response to association or re-association of the station to the access point.

Additionally, there is provided an access point through which a station accesses a wireless network. The access point includes a storage for storing information including context of the station, wherein the access point accesses a neighborhood graph, for containing information on one or more access points of the wireless network that are fit for handoff of the station thereto from the access point, and propagates information including the context of the station to the one or more access points in response to association or re-association of the station to the access point.

Additionally, there is provided a server for a wireless network having at least one access point through which a station accesses the wireless network. The server includes a storage for storing a neighborhood graph containing information on one or more access points of the wireless network that are fit for handoff of the station thereto from a corresponding one of the at least one access point, for each of the at least one access point. The neighborhood graph is accessible by each of the at least one access point, and the corresponding one of the at least one access point propagates information including context of the station to the corresponding one or more access points that are fit for handoff in response to association or re-association of the station to the corresponding one of the at least one access point.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

A preferred embodiment of the present invention will now be described in detail with reference to the annexed drawings. In the following description, the present invention proposes the preferred embodiment to achieve the above and other objects. However, other embodiments of the present invention can be drawn from the following description of the present invention.

According to an aspect of the present invention, a proactive caching technique is adopted to reduce a reassociation delay. In order for the proactive caching technique to be adopted, a procedure of propagating state information of a corresponding wireless station (STA), i.e., context, from a prior-access point (AP) to potential APs is performed irrespective of a handoff process. The potential APs are a set of APs with which the STA can associate from the prior AP of the STA. In order for the context of the STA to be sent to the potential APs as described above, the potential APs may be managed on each AP. For this, the APs may generate and manage a neighborhood graph. The neighborhood graph defines connection relationships between the potential APs and the prior AP in the handoff process.

Figure 3A:
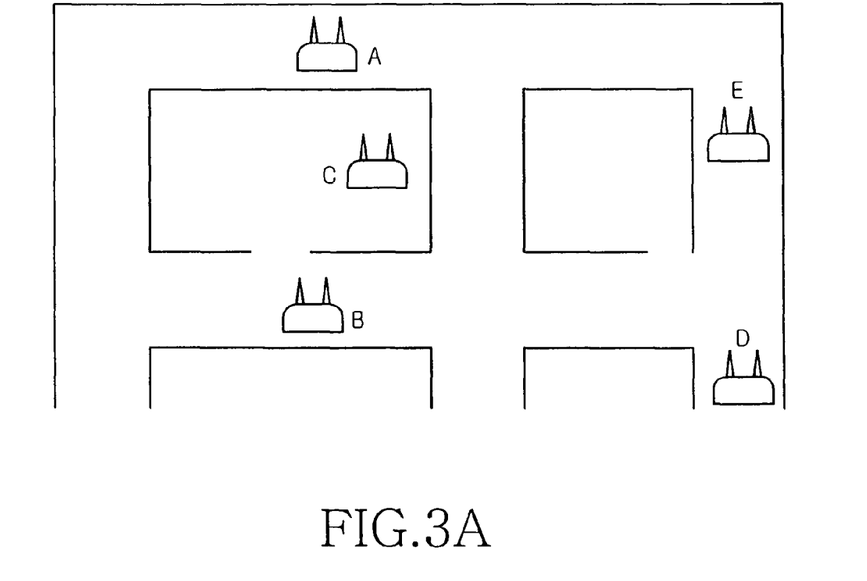
FIGS. 3A and 3B are views illustrating an operation for generating a neighborhood graph in accordance with an embodiment of the present invention.
Figure 3B:
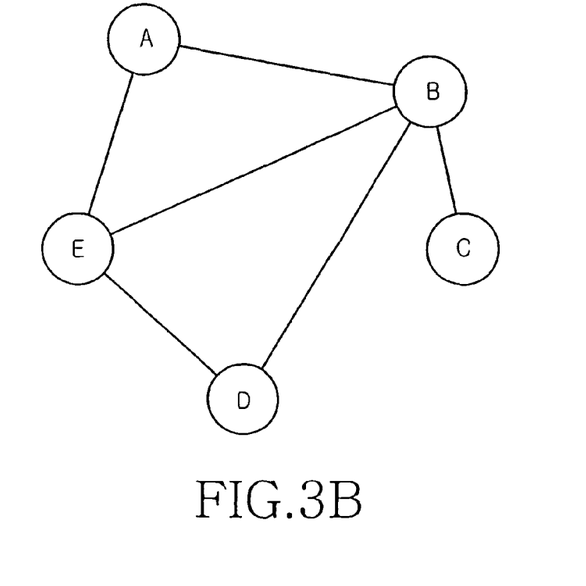

According to another aspect, as illustrated in FIG. 3B, a data structure may be provided for containing information on one or more potential APs for each of the APs. In this case, such a structure may be provided in a medium accessible by each of the APs. Methods for generating the neighborhood graph and a handoff procedure based on the proactive caching technique using the neighborhood graph will be described in detail herein below.

1. Generation of Neighborhood Graph

In accordance with the present invention, a neighborhood graph is formed by the arrangement of APs configuring a wireless local area network (WLAN). As potential APs corresponding to each of the APs configuring the WLAN are different, the generation of the neighborhood graph is achieved on an AP-by-AP basis. Three types of neighborhood graph generation methods are disclosed below. The first generation method allows a manager to manually generate the neighborhood graph. The first generation method allows the manager to configure and register neighborhood graphs on the AP-by-AP basis according to the arrangement of the APs and also allows the manager to update a neighborhood graph when the arrangement of APs is changed therein. The second generation method allows the manager to register the first neighborhood graph and also allows the neighborhood graph to be automatically changed when the arrangement of the APs is changed therein. The third generation method allows neighborhood graphs to be automatically generated on an AP-by-AP basis. In the third generation method, a handoff is performed on the basis of an existing handoff procedure to generate or update a neighborhood graph. In other words, a procedure of confirming connection relationships on an AP-by-AP basis is performed in the third generation method. For example, where the STA located at an AP_A tries to first perform a handoff process to an AP_B by which no handoff for the STA was previously performed, the AP_B performs an inter-access point protocol (IAPP) procedure to receive context corresponding to the STA from the AP_A. Then, AP_A and AP_B confirm the existence of the interconnection relationship therebetween for the handoff, such that a corresponding neighborhood graph can be generated or updated. After the neighborhood graph is updated, the handoff can be performed with respect to the STA that desires to move from AP_A to AP_B or from AP_B to AP_A without the IAPP procedure.

A physical path connected between APs and a distance between the APs should be considered so that any one of the three types of generation methods can generate a neighborhood graph. In other words, the APs configuring the WLAN must be able to be physically connected to each other without going through any other AP so that connection relationships can be formed on the basis of the neighborhood graph. Furthermore, two APs physically connected to each other should be within a threshold distance range. Where the two APs are far away from each other, a handoff may be performed according to an initial procedure for allowing a new AP to support communication.

An example of generating a neighborhood graph to be applied in accordance with an embodiment of the present invention will now be described in detail.

FIG. 3A is a view illustrating an exemplary arrangement of APs configuring the WLAN to which an embodiment of the present invention is applied; and FIG. 3B is a view illustrating an exemplary neighborhood graph capable of being generated by the arrangement of APs shown in FIG. 3A.

As shown in FIG. 3A, an AP_C is installed in a closed space with one gateway. Thus, a path in which the STA located at AP_C can move is defined by an AP_B. This means that only a handoff process between AP_C and AP_B can be performed with respect to the STA located at AP_C. The STA located at AP_B can move not only to AP_A, AP_D and AP_E but also to AP_C, which are installed at passages (as physical connections). In other words, the STA located at AP_B allows a handoff process to be performed between AP_B and all other APs shown in FIG. 3A. APs to which the STA located at AP_A can directly associate without going through any other AP are defined by AP_B and AP_E. Thus, the STA located at AP_A allows a handoff process to be performed between AP_A and AP_B or AP_E. The STA located at AP_E can directly associate to all APs other than AP_C among APs shown in FIG. 3A. This means that the STA located at AP_E allows a handoff process to be performed between AP_E and any AP except for AP_C. APs to which the STA located at AP_D can directly associate without going through any other AP are defined by AP_B and AP_E. Thus, the STA located at AP_D allows a handoff process to be performed between AP_D and AP_B or AP_E. A reason why a handoff between AP_D and AP_A is not permitted is because a distance between AP_D and AP_A is outside a predetermined threshold distance range.

FIG. 3B shows a neighborhood graph generated by the connection relationships between the above-described APs. The neighborhood graph shown in FIG. 3B shows the connection relationships between all APs configuring the WLAN. In accordance with the present invention, each AP only needs to recognize potential APs capable of being associated therewith. For example, AP_A only needs to recognize AP_B and AP_E as its potential APs, while AP_B only needs to recognize AP_A, AP_C, AP_D and AP_E as its potential APs. As described above, while not illustrated, a neighborhood graph on each AP may be generated by the manager or can be automatically generated according to an existing handoff procedure.

An operation for allowing each AP to automatically generate the neighborhood graph will now be described. Upon receiving a reassociation request message from a wireless station (STA), an arbitrary AP determines whether temporarily stored context corresponding to the STA is present. At this point, the arbitrary AP becomes a post-AP for the STA. The fact that the context is present means that a neighborhood graph with a prior-AP from which the STA moves is formed. On the other hand, if the context is not present, it can be determined that the neighborhood graph with the prior-AP from which the STA moves is not formed. In this case, the post-AP receives the context corresponding to the STA from the prior-AP through the existing IAPP, updates the neighborhood graph and forms a connection with the prior-AP. In accordance with a handoff procedure of the present invention, the handoff can be performed with respect to the STA that moves from the prior-AP after the connection is formed.

2. Proactive Caching Technique

In a proactive caching technique according to an embodiment of the present invention, each AP recognizes its potential APs. Context of the STA belonging to the AP is sent to the potential APs. Even though the STA belonging to an arbitrary AP moves to any AP connected to the arbitrary AP, the time required for a reassociation phase in the handoff procedure is minimized. That is, the proactive caching technique is based on some locality principle of mobility. In this environment, a reassociation pattern of the STA will be the sequence of APs that the STA gets associated with in a given interval of time.

Figure 4:
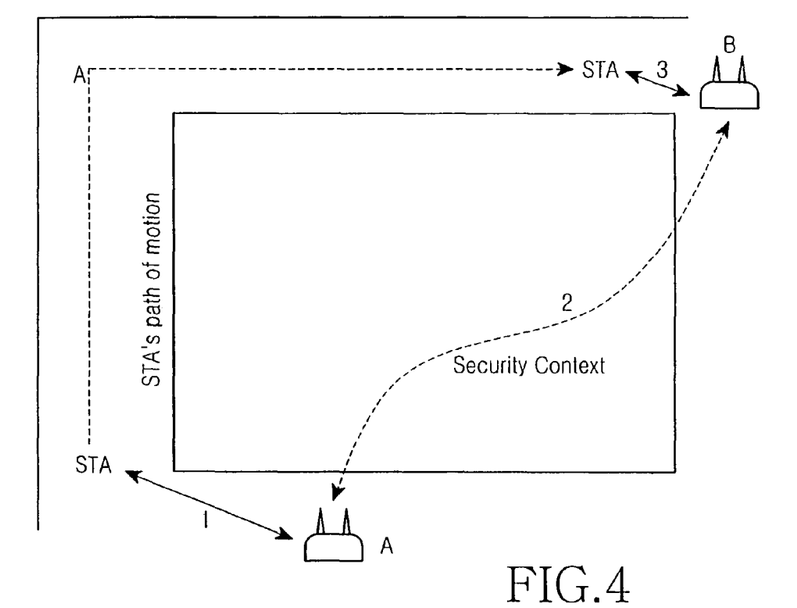
FIG. 4 is a conceptual view illustrating the handoff procedure in accordance with the embodiment of the present invention.

Proactive caching techniques for reducing a reassociation delay in accordance with the embodiment of the present invention will now be described in detail with reference to FIG. 4. FIG. 4 is a conceptual view illustrating a handoff procedure based on the proactive caching technique in accordance with the embodiment of the present invention. Here, it is assumed that a wireless station (STA) moves from an AP_A to an AP_B.

Referring to FIG. 4, the STA sends an association/reassociation request to AP_A at step 1. AP_A performs different operations according to whether the association or reassociation request is received from the STA.

When the association request is received, AP_A performs an authentication process for the STA on the basis of a typical initial authentication procedure. If the authentication process is completed, AP_A sends, to the STA, a response message to the association request.

When the reassociation request is received, AP_A performs different operations according to whether or not context corresponding to the STA has been temporarily stored. If the context corresponding to the STA has been temporarily stored, AP_A sends a response message to the STA in response to the reassociation request. On the other hand, if the context corresponding to the STA has been not temporarily stored, AP_A receives the context from an AP at which the STA was previously located through the typical IAPP procedure. Then, the response message to the reassociation request is sent to the STA. The STA performs communication with AP_A by receiving the response message from AP_A.

On the other hand, AP_A transfers the context, such as security context, corresponding to the STA to AP_B indicating a potential AP in a handoff at step 2. Only one AP is shown as the potential AP in FIG. 4. However, where a plurality of APs are present as potential APs, the context is propagated to the plurality of APs. AP_B stores the context transferred from AP_A in a cache. After moving to AP_B through a predetermined path, the STA sends a reassociation request to AP_B at step 3. In response to the reassociation request, AP_B performs communication with the STA according to the context previously transferred from AP_A. In other words, the reassociation between AP_B and the STA is performed according to the context. Thus, the present invention reduces a time delay incurred during the IAPP procedure and hence improves a communication rate.

An embodiment of the present invention employs proactive caching technique in which context of a corresponding STA can be provided to at least one predicted AP to which the STA moves. In other words, in order for the proactive caching technique to be applied, an operation for transferring context of a corresponding STA from a prior-AP to a post-AP is performed. Furthermore, each AP is able to predict information about potential post-APs so that the proactive caching technique may be applied. This has been described above in relation to the neighborhood graph.

Figure 5:
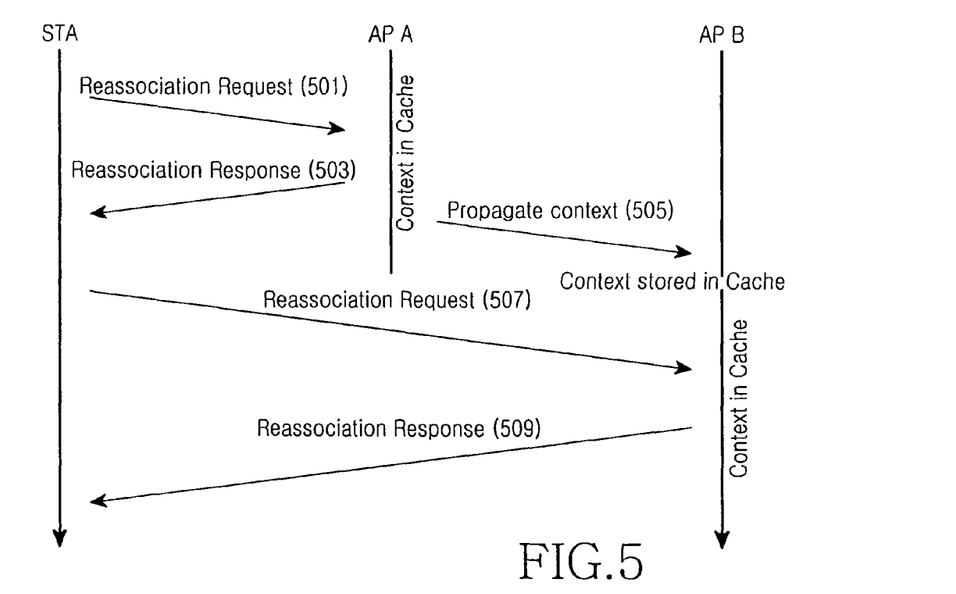
FIG. 5 is a view illustrating the handoff procedure in a wireless local area network (WLAN) in accordance with the embodiment of the present invention.

In accordance with an embodiment of the present invention, a method of reducing a reassociation delay using the proactive caching technique will now be described in detail with reference to FIG. 5. FIG. 5 is a view illustrating a handoff procedure using the proactive caching technique in the WLAN in accordance with the embodiment of the present invention.

Referring to FIG. 5, context of a corresponding STA is transferred from a prior-AP to a post-AP before a reassociation process for the handoff is performed. In FIG. 5, it is assumed that AP_A is the prior-AP and AP_B is the post-AP. Furthermore, it is assumed that the context of the corresponding STA is already temporarily stored.

Referring to FIG. 5, the STA sends a reassociation request message to AP_A at step 501. At this time, AP_A may already have stored the context of the STA using the proactive caching technique. Otherwise, if AP_A has not stored the context of the STA, AP_A can receive the context of the STA from the WLAN through the typical authentication procedure or receives the context of the STA from an AP at which the STA was previously located through the IAPP procedure. AP_A transmits a reassociation response message to the STA on the basis of the temporarily stored context corresponding to the STA at step 503. Then, AP_A propagates the temporarily stored context to a potential AP, i.e., AP_B at step 505. At this time, information of the potential AP can be obtained from the above-described neighborhood graph. It is assumed that the number of potential APs is one as shown in FIG. 5, but a plurality of potential APs can be present. If the multiple potential APs are present, AP_A propagates the context of the STA to the plurality of potential APs. AP_B temporarily stores the context corresponding to the STA propagated from AP_A.

At the time of the need for a handoff to AP_B, the STA sends a reassociation request message to AP_B at step 507. Upon receiving the reassociation request message, AP_B determines whether the temporarily stored context corresponding to the STA is present. If the temporarily stored context corresponding to the STA is present in AP_B, AP_B transmits a reassociation response message to the STA on the basis of the context at step 509. As authentication is completed between the STA and AP_B, communication between the STA and AP_B is enabled. Since the AP_B includes the context of the STA, further/another authentication may also be readily performed.

Where the proactive caching technique is applied as described above, a state in which each AP cannot store context propagated from neighboring APs may be incurred due to insufficient storage, for example, cache capacity. In this case, the AP sequentially deletes the oldest contexts so that newly propagated context can be stored.

3. Description of Operation in Accordance with the Present Invention

An operation of the AP when a handoff procedure is performed in accordance with an embodiment of the present invention will now be described in detail with respect to FIG. 6. A procedure of receiving and storing context received from neighboring APs, a procedure of performing an operation in response to an association request, and a procedure of performing an operation in response to a reassociation request will now be described with reference to FIG. 6.

Figure 6:
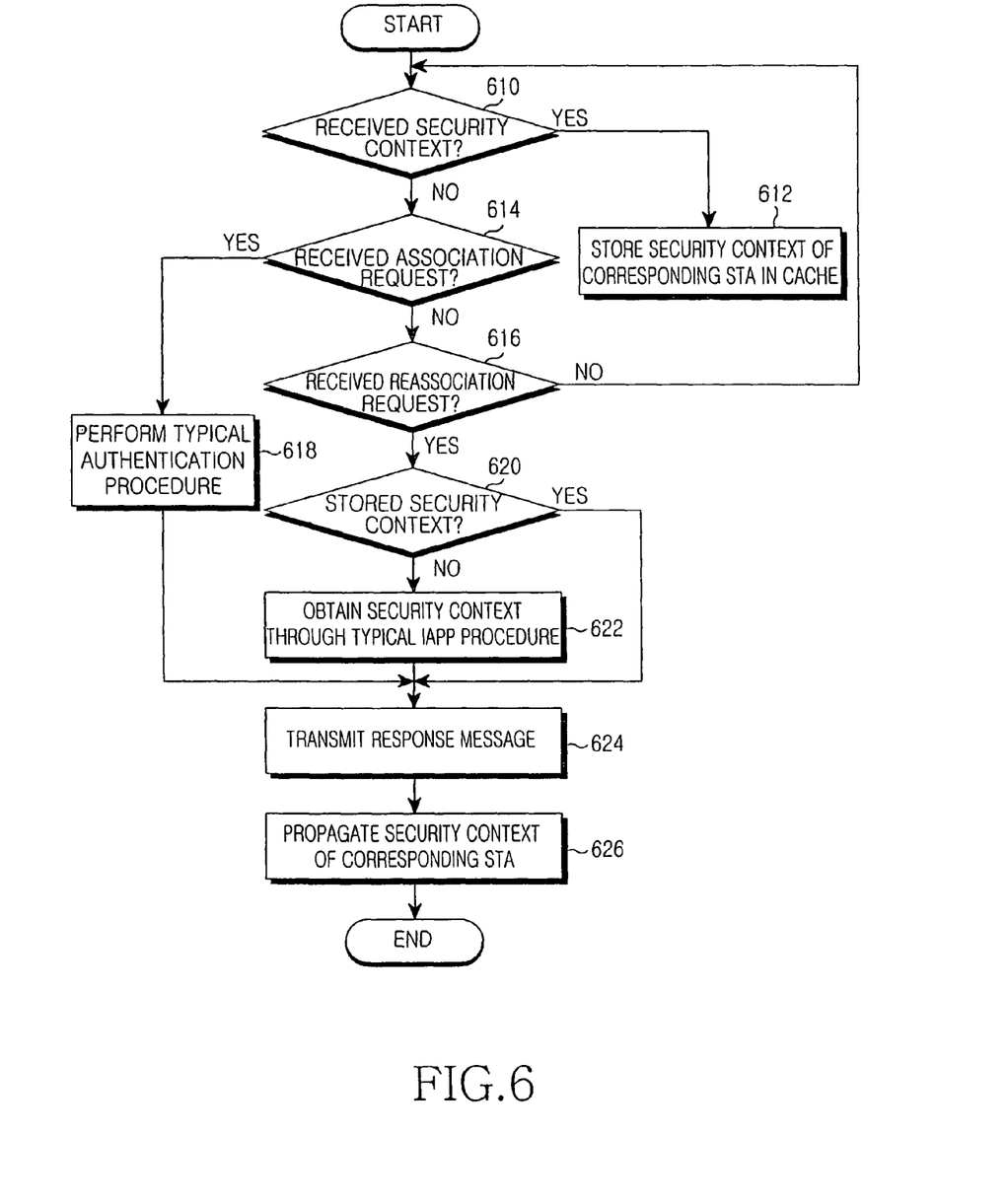
FIG. 6 is a flow chart illustrating operations of access points (APs) in accordance with the embodiment of the present invention.

Referring to FIG. 6, the AP determines whether context corresponding to a specific wireless station (STA) is received from handoff-capable neighboring APs that are managed by a neighborhood graph at step 610. Upon receiving the context corresponding to the specific STA, the AP proceeds to step 612, and stores the received context in its own cache. Although, FIG. 6 illustrates the steps for receiving and storing the security context, these steps are not necessarily required to perform the following steps 614-626.

Accordingly, the AP determines, at step 614, whether an association request has been received from the STA, and determines, at step 616, whether a reassociation request has been received from the STA. If the association request has been received from an arbitrary STA, the AP proceeds to step 618 and performs a typical authentication procedure with an authentication server provided in a wireless network. Then, the AP configures context corresponding to the STA and stores the configured context in its own cache. In step 616, if the reassociation request has been received, the AP determines that the STA has moved from another AP. Then, the AP proceeds to step 620 and determines whether context corresponding to the STA stored in the internal cache is present. If the context corresponding to the STA is not present in the internal cache, the AP proceeds to step 622. At the above step 622, the AP performs a typical IAPP procedure, and obtains the context corresponding to the STA from another AP at which the STA was previously located. If the AP recognizes another AP at which the STA was previously located, the IAPP procedure is performed only for the already recognized AP.

When the AP proceeds from the above step 618, 620 or 622 to step 624, the AP sends a response message to the STA. The response message corresponds to the association/reassociation request. Then, the AP proceeds to step 626 after sending the response message, the AP refers to a neighborhood graph managed thereby and propagates the context of a corresponding STA to neighboring APs. This is to implement a fast handoff when a corresponding STA moves to any neighboring AP.

As apparent from the above description, the present invention can provide a method for simplifying a handoff procedure in a wireless local area network (WLAN), reducing a reassociation delay, and enabling a wireless station (STA) to quickly communicate with an access point (AP) to which the STA moves. Furthermore, the method in accordance with the present invention can provide not only secure quality of service but also high-speed roaming service.

Furthermore, the present invention is applicable to all wireless communication systems and technologies, and as such may be utilized with CDMA, TDMA, FDMA, IMT, GSM, etc. systems and equipment, as well as IEEE 802.11 technology and equipment. APs as described above are analogous to base stations in telecommunication systems, while STAs are analogous to mobile terminals or stations.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments and drawings.

What is claimed is:

1. A method of propagating information including context of a station, handed off by a prior access point, from an access point to one or more other access points in a wireless network that are fit for handoff of the station thereto, the method comprising:

propagating the information including the context to the one or more other access points in response to re-association of the station to the access point.

2. The method according to claim 1, wherein each of the one or more other access points is an access point to which the station in handoff is directly associable from the access point without going through another access point of the wireless network.

3. The method according to claim 1, wherein the propagating of the information including the context comprises:

accessing a neighborhood graph comprising information indicating the one or more other access points; and
propagating the information including the context based on the information accessed from the neighborhood graph.

4. The method according to claim 3, wherein the information indicating one or more other access points comprises connection relationship information between the access point and the one or more other access points.

5. The method according to claim 3, wherein the neighborhood graph is provided in one of the access point and a server of the wireless network.

6. The method according to claim 1, wherein, in response to the context of the station not being present in the access point, the method further comprises:

forming a channel with the prior access point of the station; and receiving the information including the context from the prior access point.

7. The method according to claim 6, wherein the information including the context from the prior access point is received through an inter access point protocol procedure.

8. The method of claim 1 further comprising: propagating the information including the context to the prior access point in response to re-association of the station to the access point.

9. A computer-readable medium comprising computer-executable instructions for performing the operation of propagating information including context of a station to one or more other access points of a wireless network from an access point in response to re-association of the station to the access point from a prior access point, where the context is present in the access point and the one or more other access points are fit for handoff of the station thereto.

10. An access point through which a station accesses a wireless network, the access point comprising:

a neighborhood graph comprising information indicating one or more access points of the wireless network that are fit for handoff of the station thereto from the access point; and a storage for storing information including context of the station, wherein the access point propagates information including the context to the one or more access points in response to association or re-association of the station to the access point.

11. The apparatus according to claim 10, wherein the information indicating one or more access points comprises connection relationship information between the access point and the one or more access points.

12. The apparatus according to claim 10, wherein each of the one or more access points is an access point to which the station in handoff is directly associable from the access point without going through another access point of the wireless network.

13. The apparatus according to claim 10, wherein, in response to the storage not containing the context corresponding to the station, the access point forms a channel with a prior access point of the station and receives the information including the context from the prior access point.

14. The apparatus according to claim 10, wherein the access point and one or more access points are base stations of a telecommunication system.

15. The apparatus according to claim 10, wherein the station is a mobile terminal.

16. An access point through which a station accesses a wireless network, the access point comprising a storage for storing information including context of the station, wherein the access point accesses a neighborhood graph comprising information indicating one or more access points of the wireless network that are fit for handoff of the station thereto from the access point, and propagates information including the context of the station to the one or more access points in response to association or re-association of the station to the access point.

17. The apparatus according to claim 16, wherein the access point accesses the neighborhood graph from one of the access point and a server of the wireless network.

18. The apparatus according to claim 17, wherein the wireless network includes at least one access point, and the neighborhood graph comprises a data structure containing information on one or more access points of the wireless network that are fit for handoff of the station thereto from a corresponding one of the at least one access point, for each of the at least one access point.

19. The apparatus according to claim 16, wherein the storage is a cache for temporarily storing the information including the context.

20. The apparatus according to claim 16, wherein the access point deletes the oldest context to store newly received context in response to insufficient storage capacity.

21. A server for a wireless network having at least one access point through which a station accesses the wireless network, the server comprising a storage for storing a neighborhood graph including information indicating one or more access points of the wireless network that are fit for handoff of the station thereto from a corresponding one of the at least one access point, for each of the at least one access point, wherein:

the neighborhood graph is accessible by each of the at least one access point, and the corresponding one of the at least one access point propagates information including context of the station to the corresponding one or more access points that are fit for handoff in response to association or re-association of the station to the corresponding one of the at least one access point.

22. The apparatus according to claim 21, wherein for each of the at least one access point, each of the corresponding one or more access points is an access point to which the station in handoff is directly associable without going through another access point of the wireless network.

23. A method of propagating information including context of a station in a wireless network, the method comprising:

receiving at a first access point a request for re-association of the station to handoff the station from a second access point;

determining by the first access point information including the context of the station;

transmitting from the first access point a re-association response to the station;

propagating the context from the first access point to one or more third access points of the wireless network that are fit for handoff of the station thereto in response to re-association of the station to the first access point.

24. The method of claim 23 further comprising:

accessing by the first access point a neighborhood graph; and determining from the neighborhood graph the one or more third access points that are fit for handoff.

25. The method of claim 23 wherein propagating the context from the first access point to one or more third access points includes propagating the context to a plurality of third access points determined from a neighborhood graph.

26. The method of claim 23 further comprising:

storing the context in a cache of the first access point.

27. The method of claim 26 wherein storing the context in a cache of the first access point includes:

determining there is insufficient storage in the cache; and deleting an older context associated with another station.

28. The method of claim 23 wherein determining information including the context of the station includes:

determining the context of the station is not present in the first access point; and receiving the context through an authentication procedure with the station.

29. The method of claim 23 wherein determining information including the context of the station includes:

determining the context of the station is not present in the first access point; and receiving the context from a second access point of the station.

30. A method of propagating information including context of a station, handed off by a prior access point, from an access point to one or more other access points in a wireless network that are fit for handoff of the station thereto, the method comprising:
propagating the information including the context to the one or more access points in response to re-association of the station to the access point to reduce re-association delay.

31. A method of propagating information including context of a station in a wireless network, the method comprising:
accessing a data structure including a neighborhood graph, the neighborhood graph including connection relationships between a plurality of access points indicating whether handoff is capable between any two access points of the plurality of access points;
receiving at a first access point a request for re-association of the station to handoff the station from a second access point;
determining by the first access point information including the context of the station;
transmitting from the first access point a re-association response to the station;
determining from the neighborhood graph data structure one or more third access points having connection relationships that indicate the one or more third access points are fit for handoff from first access point;
propagating the context from the first access point to the one or more third access points of the wireless network that are fit for handoff of the station thereto in response to re-association of the station to the first access point.

* * * * *